(12) United States Patent
Khubani

(10) Patent No.: US 7,980,609 B2
(45) Date of Patent: Jul. 19, 2011

(54) REMOTE PICK-UP DEVICES

(75) Inventor: Ashok Khubani, Boontown Township, NJ (US)

(73) Assignee: Ontel Products Corporation, Fairfield, NJ (US)

( * ) Notice: Subject to any disclaimer, the term of this patent is extended or adjusted under 35 U.S.C. 154(b) by 622 days.

(21) Appl. No.: 12/010,855

(22) Filed: Jan. 30, 2008

(65) Prior Publication Data

US 2008/0224488 A1 Sep. 18, 2008

Related U.S. Application Data

(60) Provisional application No. 60/898,111, filed on Jan. 30, 2007.

(51) Int. Cl.
*A47F 13/06* (2006.01)
(52) U.S. Cl. ....................................................... 294/19.1
(58) Field of Classification Search ................. 294/19.1, 294/115; 81/177.1, 177.2, 489; 16/429; 362/120
See application file for complete search history.

(56) References Cited

U.S. PATENT DOCUMENTS

| | | | |
|---|---|---|---|
| 4,962,957 A * | 10/1990 | Traber | 294/19.1 |
| 6,315,340 B1 * | 11/2001 | Chen | 294/24 |
| 6,513,844 B1 * | 2/2003 | Hsu | 294/19.1 |
| 6,848,731 B2 * | 2/2005 | Khubani et al. | 294/19.1 |
| 6,874,833 B2 | 4/2005 | Keith | |
| 7,004,520 B2 | 2/2006 | Khubani | |
| D541,610 S | 5/2007 | Segroves | |
| D545,660 S | 7/2007 | Robinson | |
| 7,261,349 B1 | 8/2007 | Gregor | |
| 7,325,469 B1 * | 2/2008 | Clampitt et al. | 81/436 |
| 7,665,782 B2 * | 2/2010 | Buzby et al. | 294/19.1 |
| 2003/0011204 A1 * | 1/2003 | Grizzle | 294/19.1 |
| 2006/0221598 A1 | 10/2006 | March | |

* cited by examiner

*Primary Examiner* — Saúl J Rodríguez
*Assistant Examiner* — Stephen Vu
(74) *Attorney, Agent, or Firm* — Venable LLP; Jeffri A. Kaminski

(57) ABSTRACT

An improvement to elongate tools for engaging objects from remote distances includes a connection between the rod on which the engagement elements are provided and the handle of the that allows for the orientation of the rod with respect to the handle to occupy at least two pre-selected fixed positions which are angular positions approximately 90 degrees from one another.

13 Claims, 11 Drawing Sheets

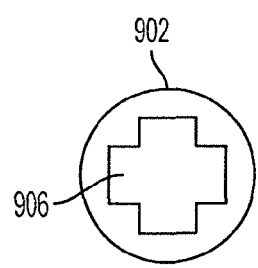
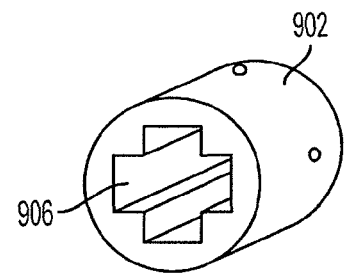
FIG. 11A　　　　　　　　FIG. 11B
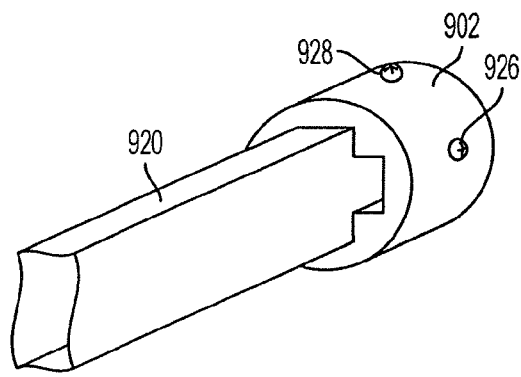
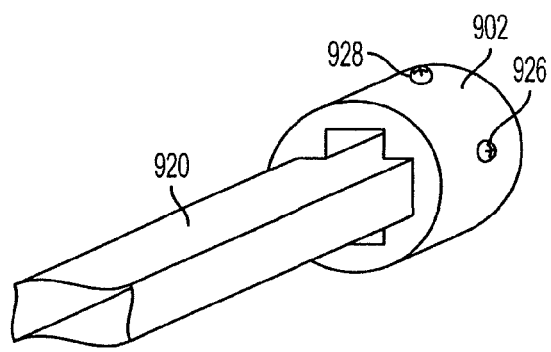
FIG. 12　　　　　　　　FIG. 13

REMOTE PICK-UP DEVICES

CROSS REFERENCE TO RELATED APPLICATION

The applicant claims the benefit of U.S. Application No. 60/989,111 filed on Jan. 30, 2007.

BACKGROUND OF THE INVENTION

This invention relates to improvements for tools designed to engage objects from remote distances.

BACKGROUND OF THE INVENTION

There are a wide variety of tools designed for picking up objects or manipulating objects from a distance. One common application for such tools is use by maintenance workers to pick up debris for subsequent disposal. A tool with an elongate handle allows manipulation of the object without the need to bend over or to directly handle the material. Such tools are also useful for individuals that have physical handicaps which may impede their ability to bend over and reach the ground. There are also numerous additional household applications for such tools such as retrieval of materials from high shelves, from under furniture, and cooking applications wherein it is desirable to keep away from heat. Such tools may also be used for the manipulation of logs in a fireplace. Another common application for such tools is for changing light bulbs from recessed lighting fixtures. Another entire class of devices that operate in a similar manner and perform a similar function as the pick-up tools described above can be marketed as toys. Other tools may have blades on the distal end for cutting that may be used for a wide range of uses including those tools used in the surgical field and tools used for trimming high branches from trees.

Common elements that are shared by such devices that are addressed by the improvement disclosed herein include (1) an elongate shaft having (2) a handle on one end and (3) engagement elements on the opposite end, (4) a controller element on the handle and (5) a linkage from the controller element to the engagement elements. The user of these tools can manipulate a controller, such as a lever or trigger, which is provided on the handle end of the device to operate the engagement elements that are provided on the opposite end of the elongate shaft. The engagement elements may include arrangements such as claws, arms, scoops, calipers, tongs, blades or cups. In typical designs, the control lever pulls an internal linkage that draws together the engagement elements that are biased apart by springs or other biasing means.

Exemplary arrangements of such devices are disclosed in U.S. Pat. No. 4,962,957 (the '957 patent), U.S. Pat. No. 4,709,839 (the '839 patent), U.S. Pat. No. 3,527,492 (the '492 patent), U.S. Pat. No. 4,613,179 (the '179 patent), U.S. Pat. No. 4,669,769 (the '769 patent), U.S. Pat. No. 6,257,634 (the '634 patent), U.S. Pat. No. 7,004,520 (the '520 patent) and U.S. Pat. No. 6,848,731 (the '731 patent).

BACKGROUND AND SUMMARY OF THE INVENTION

The present invention is directed to improvements for such pick-up devices. A first improvement allows a user of the tool to alter the orientation of engagement elements with respect to the lever or trigger that the user manipulates to control the engagement elements. While a user may be able to turn his or her arm to achieve alternative orientations of the engagement elements, this solution may be unsatisfactory in some applications, particularly when the object that is to be engaged is heavy. For example, in connection with devices that employ a pistol grip, the rear surface of the grip which rests in a section of the user's palm beneath the thumb, serves to offset the force caused by the weight of an object engaged by the engagement elements of the device in an ergonomically comfortable manner. In the event that the hand is turned 90 degrees in one direction, a side of the pistol grip engages a different part of the user's palm—a portion directly beneath the user's fingers—which offsets the force that is imposed by a downward force imposed on the opposite end of the extended arm. If the device is rotated from the upright position in the opposite direction 90 degrees, forces transmitted to the side of the pistol grip may be offset by a user's thumb. When the thumb is used to offset the force, it cannot conveniently be used to manipulate the locking mechanism of the device. It is submitted that both alternative orientations described above result in a less favorable ergonomic arrangement.

In some applications, such as the retrieval of objects under furniture, it is beneficial to orient the handle so that it is in a plane horizontal with the surface of the floor upon which the furniture rests. In this application, the engagement elements must be operated in narrow confines and may be limited to orientation in a single plane. The orientation of the handle so the engagement elements can operate within the confined space may result in an inconvenient position of the handle. In addition it may be desirable to extend the handle itself into the confined space in order to extend the effective range of the device. In these applications, if the engagement elements come together in a plane that is transverse to a plane defined by the pistol grip handle, the handle may not fit within the space or the manipulation of the trigger may be inconvenient.

In addition, because conventional pick-up devices as described herein employ extended rods, the packaging, shipping, storage and display of these devices may be inconvenient. The present invention, which involves the combination of a hinge provided at a medial location on the rod and the ability to orient the engagement elements in approximately the same plane in which the handle exists allows the device to be stored in manner where the overall profile of the device is minimized. Thus, depending on the orientation of the rod with respect to he handle, the engagement element may rest either on the lateral sides of the handle or on top section of the handle. When the engagement element are folded in such a manner where the engagement elements are brought into close on the top of the handle the engagement elements are oriented in a plane that is transverse to a plane defined by the handle and trigger. When at rest on the side, the profile of the device is larger than in the alternative arrangement because the outer extension elements that connect the engagement element to the rod extend both above and below the opposite lateral sides of the handle. In the alternative arrangement, theses engagement elements are in a plane that is parallel with that plane defined by the handle and, the total distance comprised of the width of the handle and the width of the engagement elements is reduced.

There also exist pick-up devices in the prior art wherein the handle section is in line with the extension arm or rod and the trigger or lever is designed to move toward this handle. When such devices are oriented in a position wherein the thumb is not positioned on the top of the handle, the distribution of forces on the user's hand and arm are not in an optimal arrangement. In addition, in these embodiments the thumb is often placed on the top of the device to offset the force imposed by the handle. If the orientation of the extended rod is changed, one cannot use the thumb to perform this function. Further, if the device is oriented so that the trigger is positioned on the side of the device, the orientation of the device with respect to the user's arm is also altered.

Yet a further improvement disclosed herein is the provision of a light in connection with the device. In a preferred embodiment a lamp or LED is positioned at the distal end of the rod and oriented in a manner to allow the illumination of an area near the location that the engagement elements come together. This feature is particularly advantageous when the device is used to retrieve objects that have fallen behind or from underneath furniture or appliances. In these circumstances the ambient lighting near the object that is intended to be retrieved is often poor and providing a light in association with the device assists the user in locating and manipulating the objects. A light is also beneficial when retrieving items from shelves where the ambient lighting is often not optimal. In a preferred embodiment of the device, the light source is positioned within the extended arm or rod thereby maintaining a streamlined profile for the device. This arrangement also allows the device to be used in narrow passages which may not be possible in the event that a light fixture or flashlight was mounted above or below the rod. In addition, the provision of a light source, such as an LED or bulb in at the end of the rod serves to provide a closure to the end of the rod which presents debris from entering the rod and contributes to a more pleasing appearance.

A further feature of the present invention is the provision of predetermined discrete angular positions that the rod may occupy with respect to the handle. The manner in which the rod is seated typically provides two alternative positions that are positioned ninety degrees with respect to each other. The alternative manners in which the rod is seated provide adequate support to resist the twisting of the rod in the seat when a load or torque force is placed from either the engagement elements or handles. The pre-selected positions that the rod may occupy are also advantageous because it allows the user to quickly and accurately alter the orientation of the engagement elements from alternative positions depending on the desired function or application sought by the user.

It is therefore a first object of the present invention to provide a manner in which the orientation of the engagement elements may be altered from two pre-selected positions each at angular positions that approximately ninety degrees apart from one another in connection with the elongate engagements tools so that the orientation of the engagement elements may be altered while the orientation of the user's hands may remain unchanged. A further object of the present invention is to provide a light source in the rod section in connection with elongate pick-up tools that also serves as a cap for the rod.

BRIEF DESCRIPTION OF THE DRAWINGS

FIG. 11a is an alternative embodiment of seat fitting that can be provided on the handle section of the device.

FIG. 11b is a perspective view of the seat fitting depicted in FIG. 11a.

FIG. 12 is a perspective view of a rod element in a first engagement position with the seat fitting depicted in FIGS. 11a and 11b.

FIG. 13 is a perspective view of a rod element in engagement with the seat fitting depicted in FIGS. 11a and 11b in a second alternative orientation.

DETAILED DESCRIPTION

Figure 1:
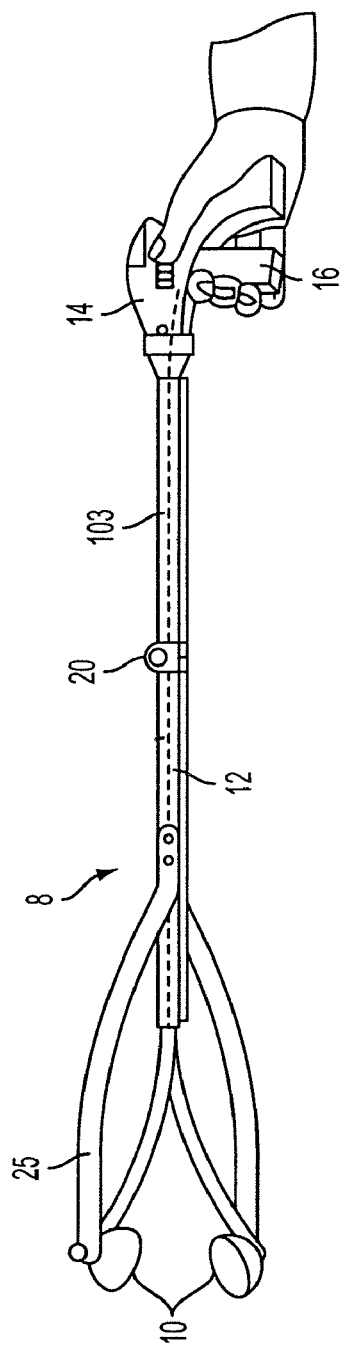
FIG. 1 is a view in elevation of a first embodiment of a pick-up device with the engagement elements which move together in a horizontal plane and at a 90 degree angle from a vertical plane in which the handle of the pistol grip is oriented.

Now referring to FIG. 1, a first embodiment of the elongate grabber tool 8 is depicted in a first position. Grabber tool 8 incorporates engagement cups 10 on a distal end of an elongate hollow rod 12 and includes a pistol grip 14 on the opposite proximal end. In this embodiment an axial section of rod 12 is rectangular. A trigger 16 is provided adjacent to pistol grip 14 for manipulation by a user's fingers. As shown on the side of pistol grip 14, a switch 18 is provided that effects a locking feature of the engagement elements of the device. In this embodiment at a medial point on elongate hollow rod 12 is hinge 20 that allows the distal portion of the rod 12 to fold in a direction toward the top side of handle 14. Stabilizer prong 25 is attached to the lateral side of the rod 12.

Figure 2:
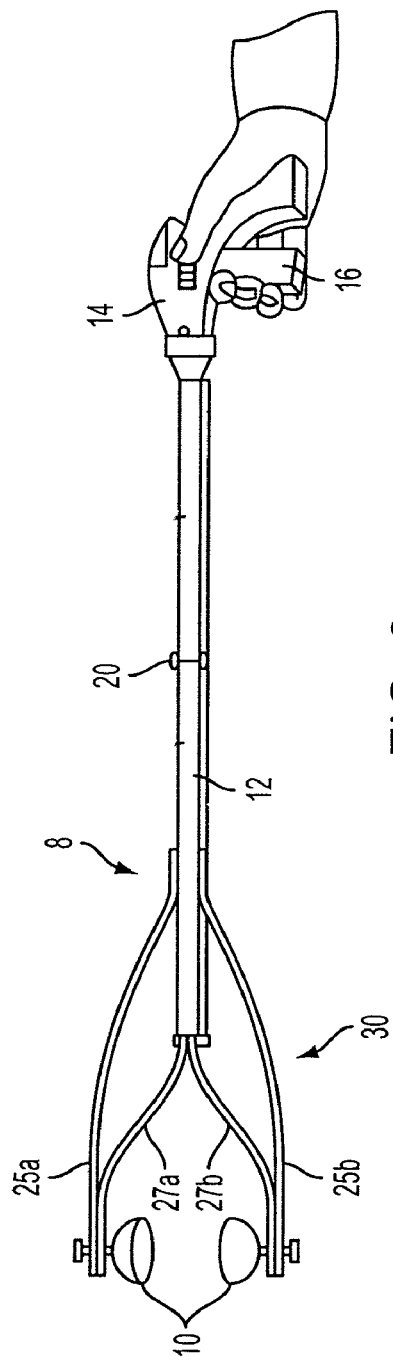
FIG. 2 is a view in elevation of the pick-up device shown in FIG. 1 wherein the movement of the engagement elements is in a vertical plane and in alignment with orientation of the plane formed by the pistol grip handle.

Now referring to FIG. 2, this depiction shows rod 12 that has been rotated 90 degrees with respect to the pistol grip 14. In this position engagement elements 30 which comprise the cups 10, outer prongs 25a and 25b and inner control prongs 27a and 27b operate in the same plane that the handle of the pistol grip defines. In this position the outer prong 25a is attached to the top of the rod and outer prong 25b is attached to the bottom of the rod. Prongs 25a and 25b are flexible and bias the cups 10 away from one another. When the engagement elements 30 are in this orientation, pivotal movement at hinge 20 causes the rod 12 to fold so that the engagement elements are drawn toward the side of the handle.

Figure 3:
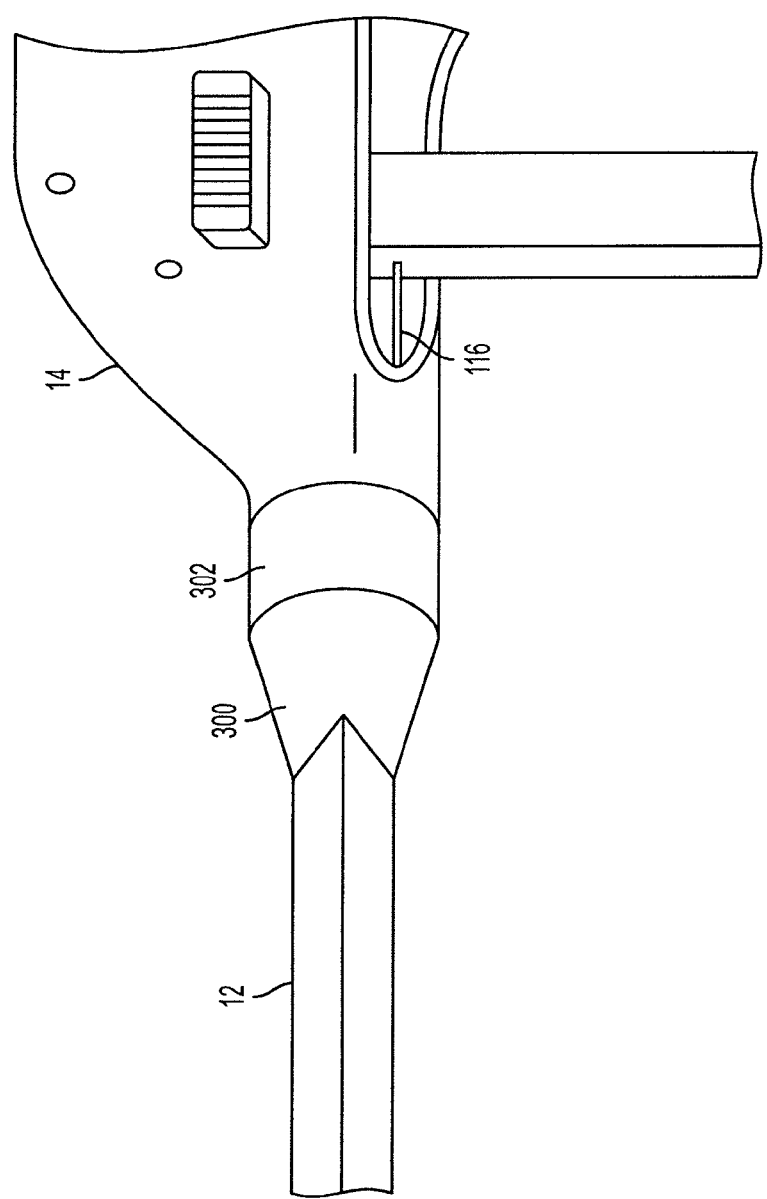
FIG. 3 is a perspective view of the first embodiment showing an annular lock fitting in a seated position with an annular seat section provided on a pistol grip handle.
Figure 4:
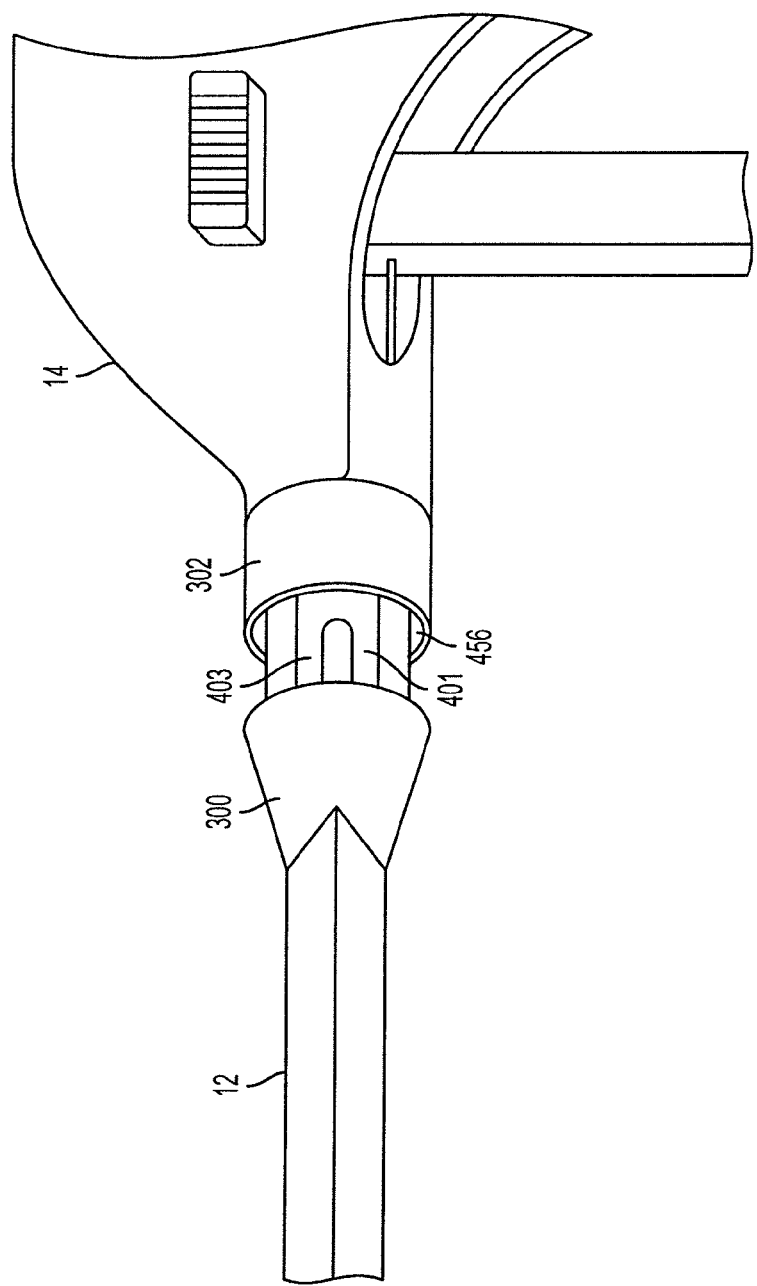
FIG. 4 is a perspective view of the embodiment depicted in FIG. 3 wherein the annular lock fitting s displaced from the seat fitting and its locking channels may be viewed.
Figure 5:
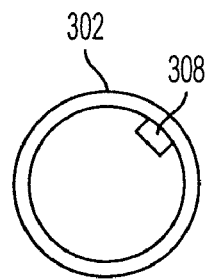
FIG. 5 is an axial view of the annular seat fitting used in connection with a first embodiment of the invention.
Figure 6:
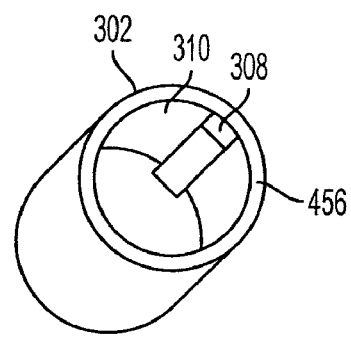
FIG. 6 is a perspective view of the annular seat fitting of FIG. 5.
Figure 7:
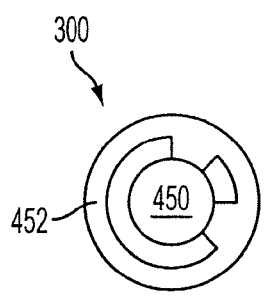
FIG. 7 is an axial view of the lock fitting depicted in FIG. 3 from which the locking channels may be viewed.
Figure 8:
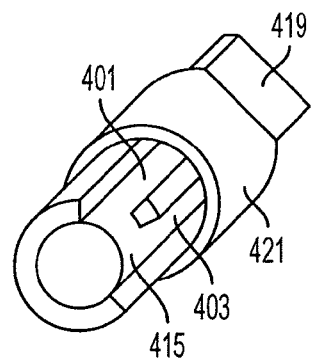
FIG. 8 is a perspective view of the lock fitting element depicted in FIG. 3.
Figure 9:
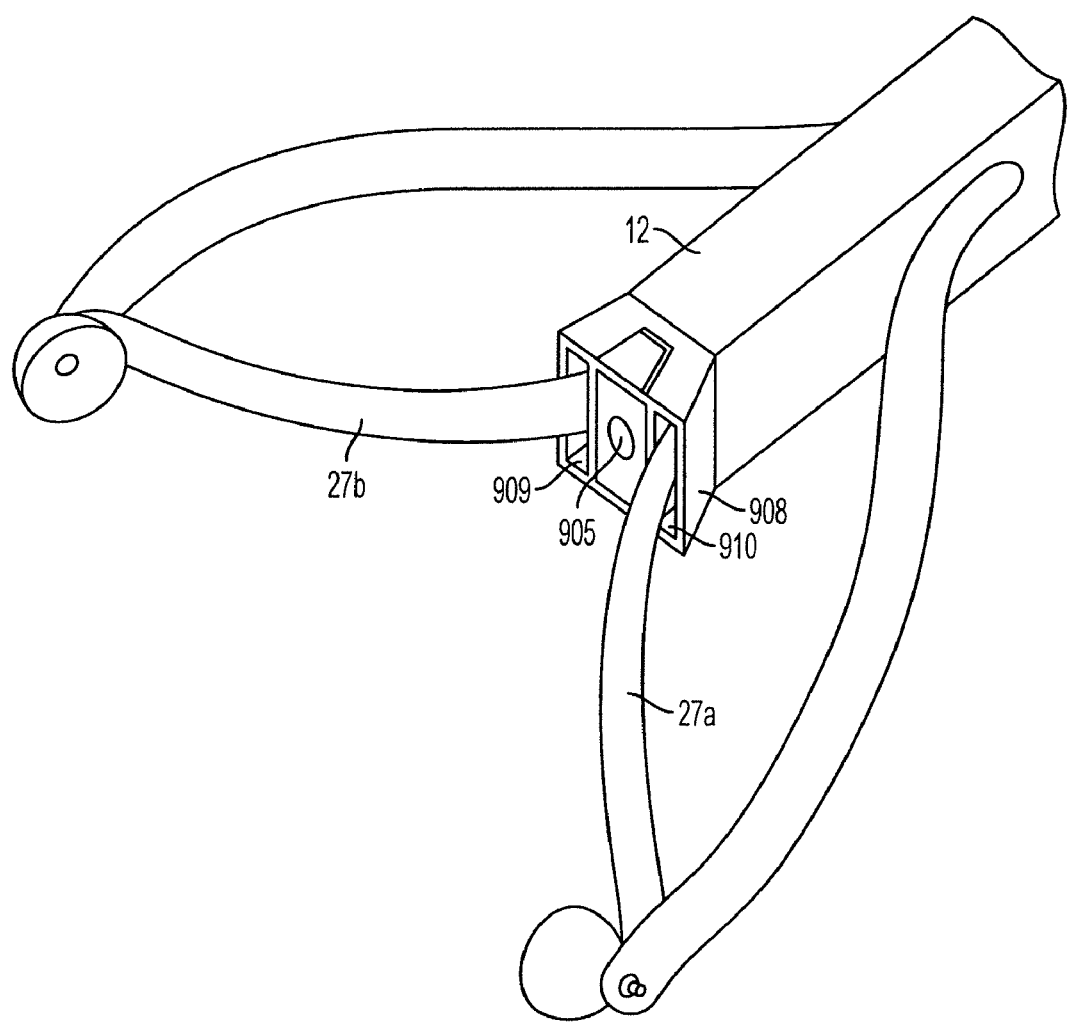
FIG. 9 is a perspective view of the front section of the device showing the engagement elements and lighting element.

Now referring to FIG. 3, attached to rod 12 is annular locking element 300 which is in engagement with seat 302. Seat 302 is provided on the front of pistol grip 14. The annular locking element is maintained in position against seat 302 by a spring (not shown) and may be displaced from the seat in a rectilinear fashion by application of a pulling force on rod 12. Now referring to FIG. 4, the annular locking element 300 is shown which has been displaced from seat 302 and a locking block located in the seat 302 is removed from channels 401 and 403 thereby allowing for limited rotation of the rod 12 with respect to the handle 14. FIGS. 5 and 6 depict the annular seat 302 which receives the locking element 300. Locking block 308 has a rectangular profile and extends from the inner side wall 310 of the seat toward a central axis defined by rod 12. The locking block 308 may be received in either channel 401 or 403 to alter the orientation of the rod with respect to the handle 14. As seen in FIGS. 8 and 9 the locking element 300 defines a central aperture 450 through which the control cable is routed down the rod to an attachment location on control prongs 27a and 27b. A biasing element such as a spring (not shown) connects the locking element 300 to seat 302. From one end of locking element 300 extends a portion 419 having a rectangular axial section that is received in the end of rod 12. From the opposite end of transition section 421 extends the locking element portion 422. The locking element portion defines channel 401, channel 403 and sliding surface 415. In operation, the locking block 308 may be within channel 403 which defines a first position wherein the engagement elements are in a first plane. If a pulling force is exerted on rod 12 the locking block 308 is displaced from channel 403 and surface 452 is displaced from surface 456. When the locking block is cleared from channel 403 the rod and locking element 300 can turn with respect to the seat 302 causing locking block 308 to slide along surface 415 and into alignment with second channel 401. If the force on the spring is then relaxed, the spring contracts and the lock block is received into second channel 401 and rotation of the rod with respect to the seat is prevented. In this second position the engagement elements are aligned in a plane that is 90 degrees offset from the previous plane.

Now referring to FIG. 9, a lamp 905 is positioned at the end of the rod 12 in a transparent fitting 908 made of synthetic resin that is received in the end of rod 12. Fitting 908 protects the light source and seats the light source at the end of the rod. The fitting has openings 909 and 910 that allow the control prongs 27a and 27b to extend into the rod and connect with the control cable. In an alternative embodiment a LED is used as the light source which is provided in the fitting. While in a preferred embodiment the light source is mounted on the end of the rod, in contemplated alternative embodiments the light source may be provided at a location along the side of the rod.

Figure 10:
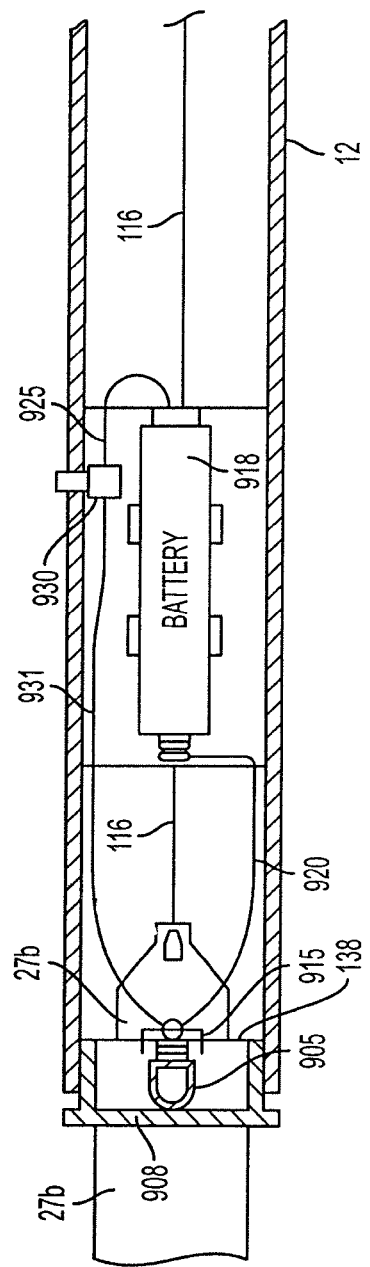
FIG. 10 is a partial sectional view of the front end of the device depicting the circuit used in connection with the lighting element.

Now referring to FIG. 10 a sectional view of the end of rod 12 is depicted showing control prong 27b which passes through fitting 908 and is attached to the control cable 116 by nipple 138. Control cable 116 extends down the length of the rod to the trigger in the handle. Lamp 905 is seated in socket 915 which is connected to battery 918 by lead 920. The opposite terminal of the battery 918 is connected to lead 925 which is connected to switch 930. Switch 930 extends through the rod 12 and the activation of the switch controls the flow of current through the circuit. Extending from switch 930 to the socket 915 is lead 931. In the preferred embodiment of the device, the is seated in position by the biasing means which urge the engagement elements apart and which comprise members 25a and 25b, 27a and 27b which are depicted in FIG. 2. A cable 116 that is attached to both the proximate ends of the 27a and 27b runs through the hollow rod and is attached to the trigger 16. Then ends of member 27a and 27b come together inside the hollow rod at location 65. If a pulling force is exerted on the rod from the handle, the rod may be unseated and members 27 and 27b slide into the top of the rod causing the engagement elements to be moved together. When the force is abated, the members 25a and 25b cause the engagement members to move apart to the open and relaxed position.

Figure 14:
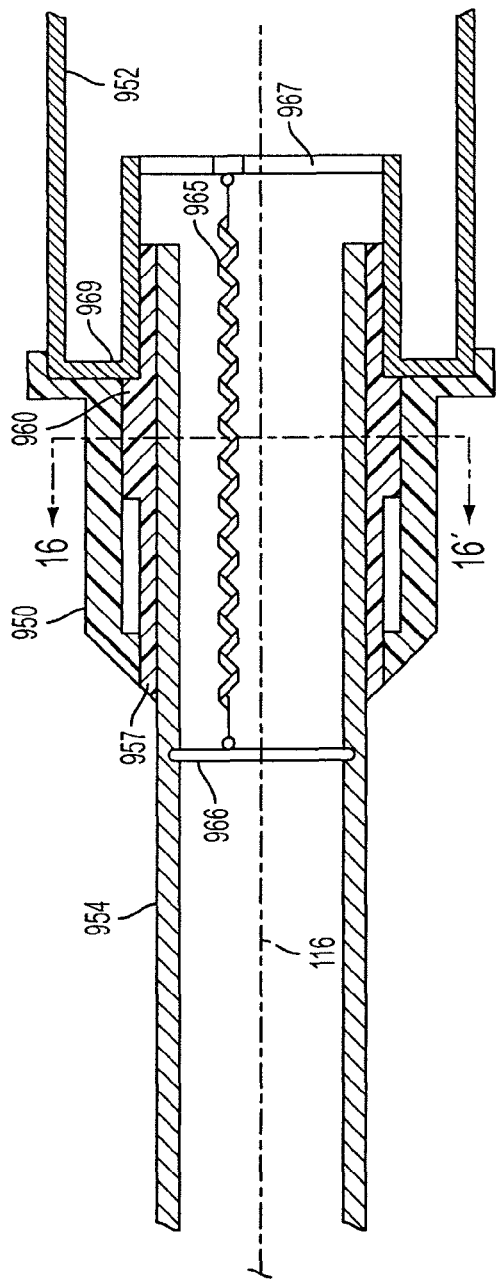
FIG. 14 is a sectional view of an alternative embodiment of the invention including a rod, a locking fitting, a seat fitting and handle.

FIGS. 11a and 11b depict an alternative embodiment of an annular fitting 902 that may be provided on the handle portion of a pick-up device and can receive a rod having a rectangular axial section. Fitting 902 defines aperture 906 that is generally in the shape of cross formed by two rectangular apertures that intersect one another. As best seen in FIGS. 12 and 14, the fitting 902 can receive rod 920 in a first position illustrated in FIG. 12 or a second position, 90 degrees from the first position, which is illustrated in FIG. 13. In this embodiment the orientation of the rod with respect to the fitting—which stays fixed on the handle—is achieved by pulling the rod out of the filling and then inserting the rod. The rod is held in place by set screws 926 and 928 which engage an aperture provided in the rod. In contemplated alternative embodiments, the rod may be held in place in the fitting by biasing means such spring loaded pins in place of the screws wherein the pins exert a force on fitting element provided on the rod that can be unseated from an engagement area by either twisting the fitting or pulling the fitting apart with sufficient force. In a contemplated embodiment using the spring loaded pins, the rod may be removed by application of a force against the biasing force to remove the rod from its seat. Then the rod is rotated 90 degrees from its first orientation and reinserted into the fitting. It is further contemplated that a fitting that could be twisted and that has a plurality of locking positions could be employed in connection with yet further embodiments of the invention, such as an arrangement where the seat is a "star shaped" and the rod has an end with the a corresponding structure that may be received in the star shaped seat. The male and females parts of these structures may be provided either on the rod or on the handles section. In each of these preferred embodiments when the rod is seated, it is prevented from rotation by the construction of the seat and corresponding structure received in the seat. By construing the in this manner only pre-selected positions may be occupied by the rod and seat and a solid and stable engagement is achieved.

Figure 15:
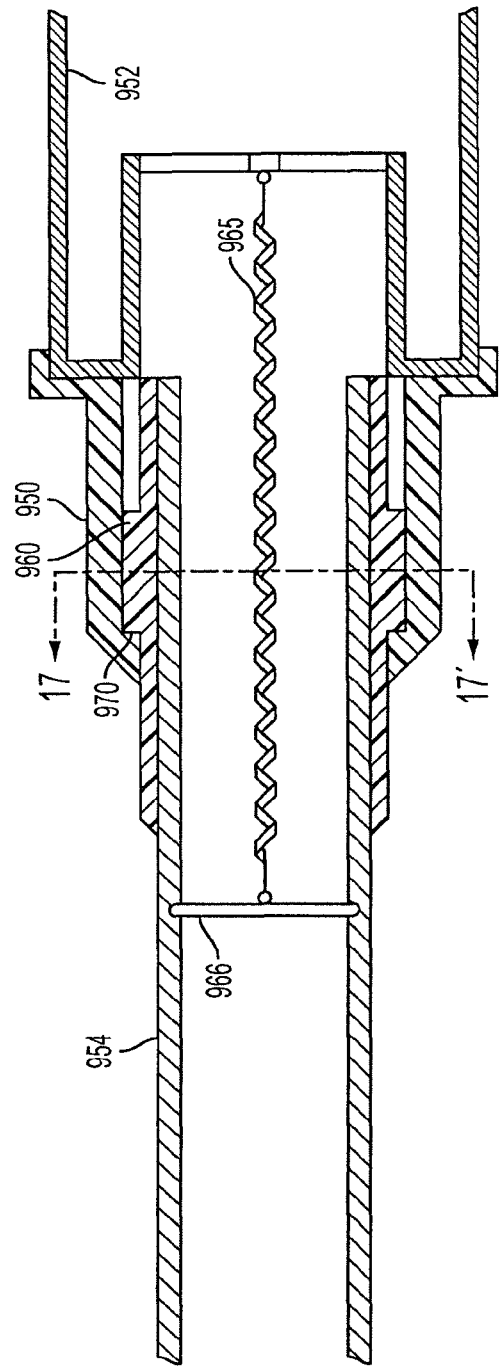
FIG. 15 depicts the embodiment of FIG. 15 wherein a pulling force is exerted on the biasing means and the locking block portion is removed from the locking.

Now referring to FIG. 14, a sectional view of a yet a further embodiment of the invention is shown. In this embodiment annular seat fitting 950 is attached to handle 952 and receives rod 954. At the end of rod 954 is an annular lock fitting that includes a raised rectangular shaped locking block section 960. As shown in FIG. 14 a central spring 965 is attached at one end to a strut 966 which is attached and fixed to rod 954 and an opposite end is attached to a strut 967 located within the handle. The rod 954 and annular fitting 957 may be displaced in a rectilinear fashion from the annular seat fitting 950 by application of a pulling force on the rod away from the handle section and thereby extending the spring 965. The spring 965 biases rod 954 and fitting 957 against surface 969 of handle 952 and this engagement restricts further movement of the rod assembly toward the handle. As best seen in FIG. 15, the rectilinear motion is restricted in the other direction by the engagement of the locking block 960 with flange section 970 that extends from annular seat fitting 950.

Figure 16:
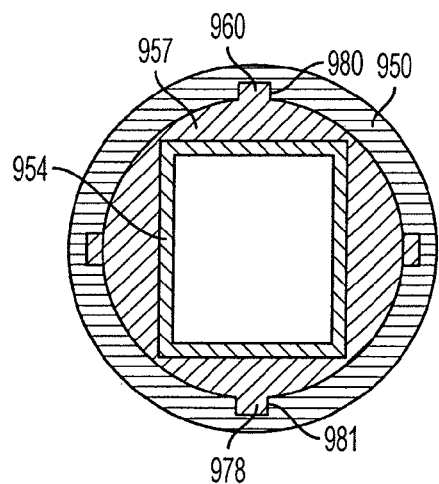
FIG. 16 depicts a sectional view of the lock fitting and the seat fitting and rod in an unlocked position along line 16-16'.

FIG. 16 depicts an axial sectional view of the embodiment disclosed in FIG. 14 along line 16-16'. In this view locking block portion 960 is depicted within channel 980 formed within the annular seat and locking block portion 978 is located within channel 981. When locking blocks 960 and 978 are received in the channels, rotation of the rod 954 and lock fitting 957 is restricted with respect to the annular seat fitting 950.

Figure 17:
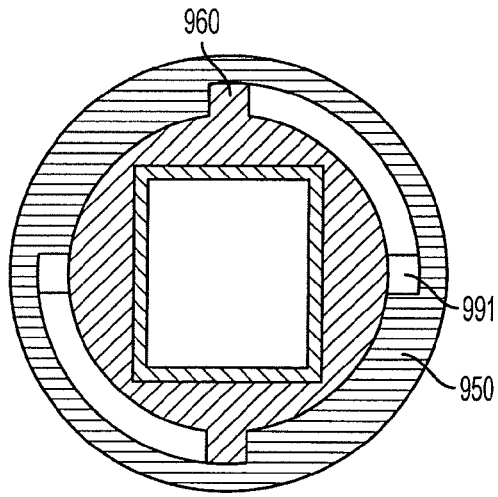
FIG. 17 depicts a sectional view of the lock fitting and the seat fitting and rod in an unlocked position along line 17-17'.

In FIG. 17, which is taken along line 17-17', the locking blocks 960 and 978 have been displaced from the channels. In this position, rod 954 and lock fitting 957 can rotate in a clockwise direction to allow lock block 960 to align with channel 991 that is formed within annular seat 950. When the lock block is aligned with the channel 991 the force on spring 965 may be released causing the spring to pull the rod towards the handle and causing lock block portion 960 to move into channel 991.

Figure 18:
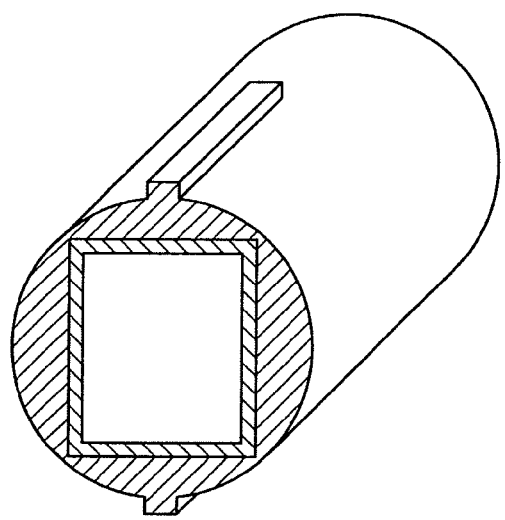
FIG. 18 depicts a sectional view in perspective of the lock fitting used in the embodiment depicted in FIGS. 14-17.

FIG. 18 depicts a perspective view of an axial section of lock fitting 957 depicting the locking block portion extending from the top side of the fitting and lock. As shown the locking block generally has a rectangular profile. While a rectangular profile is shown, it is contemplated that other profiles may be advantageously used in connection with the invention. In this regard, while a number of specific embodiments have been disclosed, it is contemplated that the rotation of an extended rod from a handle may be achieved in a wide variety of manners and the disclosure is not intended to limit the scope of the invention which is defined by claims. In addition, it is contemplated that rods having other axial profiles including circles, squares, rectangles, triangles, ovals and other polygons may be used. In addition to engagement cups which are disclosed herein, it is contemplated that the engagement elements may comprise other arrangements such as cutting blades, tongs, forks, calipers and or probes.

While a pistol grip handle is depicted in some of the embodiments, it is contemplated that other handle arrangements can also be used, including handles that are in line with the rod. One application that the products may be particularly useful for the invention is in connection with the manipulation of logs in a fireplace.

In addition, while the preferred orientation depicted in the embodiments described herein is at 90 degrees, it is contemplated that in some applications other fixed and pre-selected positions may be beneficial.

While the controller depicted in the preferred embodiment is a trigger designed to be engaged by multiple fingers of the user, the applicant contemplates that alternative arrangements of the trigger or controller may also be provided. For example, in an alternative embodiment the trigger may be manipulated by a user's single finger. In yet another contemplated alternative embodiment, the trigger may be displaced on the rear side of the stationary pistol grip handle.

The device may further include a locking device such as the one disclosed in U.S. Pat. No. 7,004,520 which is hereby incorporated by reference herein. In addition, in the preferred embodiment the device may employ a hinge feature that is disclosed in U.S. Pat. No. 6,848,731 that is also incorporated by reference herein. While the preferred embodiment uses the hinge disclosed in '731 patent other conventional hinge mechanisms, including locking hinges and spring loaded hinges, may also be advantageously employed and which are generally known in the art.

While the preferred embodiments have been described herein, those skilled in the art will recognize that certain details may be changed without departing from the spirit and scope of the invention. Thus, the foregoing specific embodiments and applications are illustrative only and are not intended to limit the scope of the invention. It is contemplated that the invention will be functional and effective in diverse applications where it is desirable to have remote engagement elements or other manipulative elements that are designed to engage or otherwise manipulate objects from a remote distance, when it is desirable to be able to alter the orientation of the elements and illuminate the target object.

I claim:

1. An improvement for an elongate tool device that engages objects from remote distances and that have engagement elements located on a distal end of a rod, said rod defining an axis, a handle at a proximate end of said rod, a controller on said handle to control said engagement elements, and a linkage between said controller and said engagement elements to control said engagement elements, said improvement comprising connection means located between said engagement elements and said handle wherein said connection means comprises a locking element disposed at the proximate end of the rod, a seat adapted to receive the locking element, and a radial extension provided on an inner surface of the seat, the locking element having at least two axial grooves adapted to receive the radial extension for allowing the orientation of said rod with respect to said handle to be seated into at least two pre-selected fixed positions which are at angular positions on an axis defined by said rod and which are approximately 90 degrees from one another.

2. The device recited in claim 1 wherein said handle further comprising a pistol grip connected to said rod.

3. The device recited in claim 2 further comprising a hinge located on said rod between said engagement elements and said handle allowing said rod to fold to permit the engagement elements to come into close proximity with said handle.

4. The device recited in claim 1 further comprising a light source located in axial alignment with said rod, and said light source comprising a power source and an illumination element.

5. The device recited in claim 4 wherein said illumination element comprises a light emitting diode.

6. The device recited in claim 1 wherein said handle is connected to said rod and in axial alignment with said rod.

7. The device recited in claim 1 wherein an axial section of said rod is polygonal.

8. The device recited in claim 1 wherein said device further comprises biasing means to urge said locking element against said seat and said biasing means comprise opposite flexible members which are mounted on the end of said rod, and a central cable attached to said controller.

9. The device recited in claim 1 wherein said controller comprises a trigger.

10. The device as recited in claim 1, further comprising a lock member, said lock member comprising a receiving surface and a stop member, said receiving surface extending from said trigger and adapted to receive said stop member, and said receiving surface attached to said trigger member in a rigid and fixed relationship, said lock member further comprising a switch member, said switch member connected to said stop member to control the movement of said stop member, wherein in response to movement of said switch member, said stop member either engages or disengages said receiving surface wherein when said stop member is engaged with said receiving surface, the movement of said trigger is prevented and when said stop member is disengaged from said receiving surface said trigger is allowed to be displaced.

11. The device as recited in claim 1 wherein said engagement means comprise opposite cup shaped members.

12. The device as recited in claim 1 wherein said linkage comprises a cable and said cable is connected to said controller and said engagement elements.

13. The device as recited in claim 12 wherein said rod is hollow and said linkage is contained within said rod and one end of said linkage is attached to said trigger.

* * * * *